United States Patent
Wang

(10) Patent No.: US 12,082,050 B2
(45) Date of Patent: Sep. 3, 2024

(54) METHOD AND APPARATUS FOR CONTROLLING QUALITY OF SERVICE OF SIDELINK COMMUNICATION, MEDIUM, AND ELECTRONIC DEVICE

(71) Applicant: Tencent Technology (Shenzhen) Company Limited, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 385 days.

(21) Appl. No.: 17/407,087

(22) Filed: Aug. 19, 2021

(65) Prior Publication Data
US 2021/0385693 A1 Dec. 9, 2021

Related U.S. Application Data

(63) Continuation of application No. PCT/CN2020/083878, filed on Apr. 9, 2020.

(30) Foreign Application Priority Data

May 6, 2019 (CN) .......................... 201910370663.5

(51) Int. Cl.
*H04W 28/24* (2009.01)
*H04W 4/40* (2018.01)

(52) U.S. Cl.
CPC .............. *H04W 28/24* (2013.01); *H04W 4/40* (2018.02)

(58) Field of Classification Search
CPC ................................ H04W 28/24; H04W 4/40
See application file for complete search history.

(56) References Cited

U.S. PATENT DOCUMENTS

2013/0324114 A1* 12/2013 Raghothaman ....... H04W 76/14
455/426.1
2017/0288886 A1* 10/2017 Atarius ................... H04L 47/20
(Continued)

FOREIGN PATENT DOCUMENTS

CN 107889255 A 4/2018
CN 108307449 A 7/2018
(Continued)

OTHER PUBLICATIONS

Anonymous, "3rd Generation Partnership Project; Technical Specification Group Services and System Aspects; Study on Architecture Enhancements for the Evolved Packet System (EPS) and the 5G System (5GS) to Support Advanced V2X Services (Release 16)", 3GPP Standard; Technical Report; 3GPP TR 23.786, 3rd Generation Partnership Project (3GPP), Mobile Competence Centre, France, No. V16.0.0, Mar. 28, 2019, XP051722960, 118 pgs.
(Continued)

*Primary Examiner* — Saad A. Waqas
(74) *Attorney, Agent, or Firm* — Morgan, Lewis & Bockius LLP

(57) ABSTRACT

Embodiments of this application provide a method for controlling quality of service (QoS) of sidelink communication performed at a core network entity. The method includes: obtaining QoS information configured by an application function (AF) entity for a sidelink; establishing a protocol data unit (PDU) session for the sidelink when determining, according to the QoS information, that the AF entity sets a per-flow QoS model for the sidelink, and generating a sidelink per-flow QoS parameter according to the QoS information; and configuring the sidelink per-flow QoS parameter on an access network entity and a terminal device, to control QoS of sidelink communication performed by the terminal device. In technical solutions of the embodiments of this application, a per-flow QoS mechanism (Continued)

can be implemented on a sidelink, thereby effectively improving effectiveness and reliability of communication on the sidelink and meeting service requirements of sidelink communication.

15 Claims, 6 Drawing Sheets

(56) References Cited

U.S. PATENT DOCUMENTS

| | | | |
|---|---|---|---|
| 2018/0041936 A1 | | 2/2018 | Kim et al. |
| 2022/0021624 A1* | | 1/2022 | Sachs ............... H04L 47/28 |

FOREIGN PATENT DOCUMENTS

| | | | | |
|---|---|---|---|---|
| CN | 109246659 A | | 1/2019 | |
| CN | 110225555 A | | 9/2019 | |
| EP | 2076077 A2 | | 7/2009 | |
| EP | 2903390 A1 | | 8/2015 | |
| JP | 2009159526 A | | 7/2009 | |
| JP | 2017143568 A | | 8/2017 | |
| JP | 2018191333 A | | 11/2018 | |
| WO | WO 2010001373 A1 | | 1/2010 | |
| WO | WO 2018205155 A1 | | 11/2018 | |
| WO | WO-2020057717 A1 | * | 3/2020 | ........... H04L 41/147 |
| WO | WO-2020114569 A1 | * | 6/2020 | ........... H04W 24/02 |

OTHER PUBLICATIONS

Extended European Search Report, EP20802246.7, May 30, 2022, 10 pgs.

Huawei (Rapporteur), Summary of Discussion [104#58][NR V2X]—QoS support for NR V2X[online], 3GPP RAN WG2 #105 R2-1900370, InternTSG, 22 pgs., Retrieved from the Internet: http://www.3gpp.org/ftp/tsg_ran/WG2_RL2/TSGR2_105/Docs/R2-1900370.zip.

CATT, "TS 23.287 Procedure for QoS Handling for V2X Communication Over PC5 Reference Point", 3GPP TSG SA WG2 #130, S2-1900402, Jan. 25, 2019, 3 pgs., Retrieved from the Internet: https://www.3gpp.org/ftp/tsg_sa/WG2_Arch/TSGS2_130_Kochi/Docs/S2-1900402.

Samsung, "PC5 Unicast", 3GPP TSG SA WG2 #132, S2-1903245, Apr. 12, 2019, 11 pgs., Retrieved from the Internet: https://www.3gpp.org/ftp/tsg_sa/WG2_Arch/TSGS2_130_Kochi/Docs/S2-1900402.

Samsung, "Solution for QoS Control on PC5 Traffic", 3GPP TSG SA WG2 #129, S2-1810312, Oct. 19, 2018, 3 pgs., Retrieved from the Internet: https://www.3gpp.org/ftp/tsg_sa/WG2_Arch/TSGS2_130_Kochi/Docs/S2-1900402.

Tencent Technology, JP Office Action, Japanese Patent Application No. 2021-541642, Aug. 15, 2022, 6 pgs.

Tencent Technology, ISR, PCT/CN2020/083878, May 27, 2020, 2 pgs.

Tencent Technology (Shenzhen) Company Limited, Korean Office Action, KR 10-2021-7023098, Sep. 30, 2023, 12 pgs.

Anonymous, "Architecture Enhancements for 5G System (5GS) to Support Vehicle-to-Everything (V2X) Services", 3$^{rd}$ Generation Partnership Project; Technical Specification Group Services and System Aspects 23.287; Release 16, V0.3.0, Apr. 2019, 40 pgs.

Tencent Technology, WO, PCT/CN2020/083878, May 27, 2020, 5 pgs.

Tencent Technology, IPRP, PCT/CN2020/083878, Nov. 2, 2021, 6 pgs.

Huawei, HiSilicon, "Procedures for the Provision of Network-controlled QoS for PC5 Communication", S2-186839, SA WG2 Meeting #128, Vilnius, Lithuania, Jul. 2-6, 2018, 6 pgs.

Vivo, "Discussion on QoS Management for NR V2X", R2-1903636, 3GPP TSG-RAN WG2 Meeting #105bis, Xi'an, China, Apr. 8-12, 2019, 4 pgs.

* cited by examiner

METHOD AND APPARATUS FOR CONTROLLING QUALITY OF SERVICE OF SIDELINK COMMUNICATION, MEDIUM, AND ELECTRONIC DEVICE

CROSS REFERENCE TO RELATED APPLICATIONS

This application is a continuation application of PCT Patent Application No. PCT/CN2020/083878, entitled "METHOD AND APPARATUS FOR CONTROLLING QUALITY OF SERVICE OF SIDELINE COMMUNICATION, MEDIUM—AND ELECTRONIC DEVICE" filed on Apr. 9, 2020, which claims priority to Chinese Patent Application No. 201910370663.5, filed with the State Intellectual Property Office of the People's Republic of China on May 6, 2019, and entitled "METHOD AND APPARATUS FOR CONTROLLING QUALITY OF SERVICE OF SIDELINK COMMUNICATION, MEDIUM, AND ELECTRONIC DEVICE", all of which are incorporated herein by reference in their entirety.

FIELD OF DIE TECHNOLOGY

This application relates to the field of computer and communication technologies, and specifically, to a method and apparatus for controlling quality of service (QoS) of sidelink communication, a medium, and an electronic device.

BACKGROUND OF THE DISCLOSURE

Effectiveness and reliability of vehicle-to-everything (V2X) conununication are inseparable from safety of automated driving. The effectiveness means that data can be transmitted timely, which may be embodied as a low latency. The reliability means a low packet loss rate of data transmission. Meanwhile, the V2X communication may be performed through a sidelink in addition to an uplink and a downlink. However, when the V2X communication is performed through the sidelink, how to ensure effectiveness and reliability of the communication is a technical problem to be resolved urgently.

SUMMARY

Embodiments of this application provide a method and an apparatus for controlling QoS of sidelink communication, a medium, and an electronic device, to implement a per-flow QoS mechanism on a sidelink at least to some extent, thereby effectively improving effectiveness and reliability of communication on the sidelink.

Other features and advantages of this application become obvious through the following descriptions, or may be partially learned partially through the practice of this application.

According to an aspect of the embodiments of this application, a method for controlling QoS of sidelink communication is provided and performed at a core network entity, the method including: obtaining QoS information configured by an application function (AF) entity for a sidelink; establishing a protocol data unit (PDU) session for the sidelink when determining, according to the QoS information, that the AF entity sets a per-flow QoS model for the sidelink, and generating a sidelink per-flow QoS parameter according to the QoS information; and configuring the sidelink per-flow QoS parameter on an access network entity and a terminal device, to control QoS of sidelink communication performed by the terminal device.

According to an aspect of the embodiments of this application, a method for controlling QoS of sidelink communication is provided, applicable to an access network entity, the method including: obtaining sidelink per-flow QoS parameter information configured by a core network entity for the access network entity; determining sidelink per-flow QoS parameter information configured for a terminal device according to the sidelink per-flow QoS parameter information configured for the access network entity; and configuring the sidelink per-flow QoS parameter information configured for the terminal device on the terminal device, to control QoS of sidelink communication performed by the terminal device.

According to an aspect of the embodiments of this application, a method for controlling QoS of sidelink communication is provided, applicable to a terminal device, the method including: obtaining a first sidelink per-flow QoS parameter configured by a core network entity and a second sidelink per-flow QoS parameter configured by an access network entity; and performing sidelink communication based on the first QoS parameter and the second QoS parameter According to an aspect of the embodiments of this application, a method for controlling QoS of sidelink communication is provided, including: an obtaining unit, configured to obtain QoS information configured by an AF entity for a sidelink; a processing unit, configured to establish a PDU session for the sidelink when determining, according to the QoS information, that the AF entity sets a per-flow QoS model for the sidelink, and generate a sidelink per-flow QoS parameter according to the QoS information; and a configuration unit, configured to configure the sidelink per-flow QoS parameter on an access network entity and a terminal device, to control QoS of sidelink communication performed by the terminal device.

In some embodiments of this application, based on the foregoing solutions, the processing unit is configured to establish a user plane PDU session and a control plane PDU session for the sidelink, the user plane PDU session being used for performing sidelink communication between terminal devices, and the control plane PDU session being used for performing communication between the core network entity and the terminal device.

In some embodiments of this application, based on the foregoing solutions, the processing unit is configured to generate a user plane PDU session parameter for the sidelink; and configure the user plane PDU session parameter on the terminal device, for the terminal device to establish the user plane PDU session for the sidelink according to the user plane PDU session parameter.

In some embodiments of this application, based on the foregoing solutions, the sidelink per-flow QoS parameter includes a QoS parameter for the access network entity and a QoS parameter for the terminal device; and the configuration unit is configured to configure the QoS parameter for the access network entity on the access network entity, and configure the QoS parameter for the terminal device on the terminal device through non-access stratum (NAS) signaling.

In some embodiments of this application, based on the foregoing solutions, the QoS parameter for the access network entity includes: a resource scheduling mode to be used by the access network entity for the terminal device, and a QoS requirement corresponding to the resource scheduling mode; or QoS requirement information for the sidelink, the QoS requirement information being used for the access network entity to determine a resource scheduling mode for the terminal device and a QoS requirement corresponding to the resource scheduling mode.

According to an aspect of the embodiments of this application, an apparatus for controlling QoS of sidelink communication is provided, including: an obtaining unit, configured to obtain sidelink per-flow QoS parameter information configured by a core network entity for an access network entity a determining unit, configured to determine sidelink per-flow QoS parameter information configured for a terminal device according to the sidelink per-flow QoS parameter information configured for the access network entity; and a configuration unit, configured to configure the sidelink per-flow QoS parameter information configured for the terminal device on the terminal device, to control QoS of sidelink communication performed by the terminal device.

In some embodiments of this application, based on the foregoing solutions, the determining unit is configured to determine a resource scheduling mode for the terminal device to perform sidelink communication and a QoS requirement corresponding to the resource scheduling mode according to the sidelink per-flow QoS parameter information configured for the access network entity; and generate the sidelink per-flow QoS parameter information configured for the terminal device according to the resource scheduling mode and the QoS requirement corresponding to the resource scheduling mode.

In some embodiments of this application, based on the foregoing solutions, the determining unit is configured to obtain the resource scheduling mode and the QoS requirement corresponding to the resource scheduling mode from the sidelink per-flow QoS parameter information configured for the access network entity; or generate the resource scheduling mode and the QoS requirement corresponding to the resource scheduling mode according to sidelink per-flow QoS requirement information included in the sidelink per-flow QoS parameter information configured for the access network entity.

In some embodiments of this application, based on the foregoing solutions, the apparatus for controlling QoS of sidelink communication further includes: a control unit, configured to control the terminal device to perform AS monitoring on a sidelink.

In some embodiments of this application based on the foregoing solutions, the control unit is configured to control a first terminal device to transmit a reference signal (RS) through a sidelink established between the first terminal device and a second terminal device; receive detection information fed back by the second terminal device for the RS; and determine a communication state of the sidelink between the first terminal device and the second terminal device according to the detection information.

In some embodiments of this application, based on the foregoing solutions, the apparatus for controlling QoS of sidelink communication further includes: a maintenance unit, configured to maintain the sidelink according to a result of monitoring the sidelink by the terminal device.

In some embodiments of this application, based on the foregoing solutions, the maintenance unit is configured to reconfigure a sidelink between the first terminal device and the second terminal device when determining that the communication state of the sidelink between the first terminal device and the second terminal device deteriorates according to the communication state: and release the sidelink between the first terminal device and the second terminal device when determining that the sidelink is no longer suitable for data transmission according to the communication state.

According to an aspect of the embodiments of this application, an apparatus for controlling QoS of sidelink communication is provided, including: an obtaining unit, configured to obtain a first sidelink per-flow QoS parameter configured by a core network entity and a second sidelink per-flow QoS parameter configured by an access network entity; and a communication unit, configured to perform sidelink communication based on the first QoS parameter and the second QoS parameter.

In some embodiments of this application, based on the foregoing solutions, the communication unit is configured to detect a communication peer according to identification information of the communication peer and perform sidelink communication with the communication peer based on the first QoS parameter and the second QoS parameter when detecting that the communication peer is within a communication range.

In some embodiments of this application, based on the foregoing solutions, the apparatus for controlling QoS of sidelink communication further includes: a processing unit, configured to perform AS monitoring and/or maintenance processing on a sidelink based on control information of the access network entity.

According to an aspect of the embodiments of this application, a non-transitory computer-readable medium is provided, storing a computer program, the computer program, when executed by a processor, implementing the method for controlling QoS of sidelink communication according to the foregoing embodiments.

According to an aspect of the embodiments of this application, a core network entity is provided, including: one or more processors; and a storage apparatus, configured to store one or more programs, the one or more programs, when executed by the one or more processors, causing the one or more processors to implement the following operations:

obtaining QoS information configured by an AF entity for a sidelink;

establishing a PDU session for the sidelink when determining, according to the QoS information, that the AF entity sets a per-flow QoS model for the sidelink, and generating a sidelink per-flow QoS parameter according to the QoS information; and configuring the sidelink per-flow QoS parameter on an access network entity and a terminal device, to control QoS of sidel ink communication performed by the terminal device.

According to an aspect of the embodiments of this application, an access network entity is provided, including:

one or more processors; and a storage apparatus, configured to store one or more programs, the one or more programs, when executed by the one or more processors, causing the one or more processors to implement the following operations:

obtaining sidelink per-flow QoS parameter information configured by a core network entity for the access network entity;

determining sidelink per-flow QoS parameter information configured for a terminal device according to the sidelink per-flow QoS parameter information configured for the access network entity; and configuring the sidelink per-flow QoS parameter information configured for the terminal device on the terminal device, to control QoS of sidelink communication performed by the terminal device.

According to an aspect of the embodiments of this application, a terminal device is provided, including:
   one or more processors; and
   a storage apparatus, configured to store one or more programs, the one or more programs, when executed by the one or more processors, causing the one or more processors to implement the following operations:
      obtaining a first sidelink per-flow QoS parameter configured by a core network entity and a second sidelink per-flow QoS parameter configured by an access network entity; and
      performing sidelink communication based on the first QoS parameter and the second QoS parameter.

In technical solutions provided in some embodiments of this application, a core network entity establishes a PDU session for a sidelink when determining that an AF entity sets a per-flow QoS model for the sidelink, generates a sidelink per-flow QoS parameter, and configures the sidelink per-flow QoS parameter on an access network entity and a terminal device, to control QoS of sidelink communication performed by the terminal device, so that a per-flow QoS mechanism can be implemented on the sidelink, thereby effectively improving effectiveness and reliability of communication on the sidelink and meeting service requirements of sidelink communication.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into a specification and constitute a part of this specification, show embodiments that conform to this application, and are used for describing a principle of this application together with this specification. Obviously, the accompanying drawings in the following descriptions are merely some embodiments of this application, and a person of ordinary skill in the art may further obtain other accompanying drawings according to the accompanying drawings without creative efforts. In the accompanying drawings.

DESCRIPTION OF EMBODIMENTS

Exemplary implementations are now described more comprehensively with reference to the accompanying drawings. However, the exemplary embodiments can be implemented in various forms and are not construed as being limited to the examples herein. Conversely, such implementations are provided to make this application more comprehensive and complete, and fully convey the concepts of the exemplary implementations to a person skilled in the art.

In addition, the described characteristics, structures, or features may be combined in one or more embodiments in any appropriate manner. In the following descriptions, more content is provided to give a comprehensive understanding of the embodiments of this application. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described, to avoid obscuring the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The different networks and/or processor apparatuses and/or microcontroller apparatuses refer to: at least one of the different networks, the different processing apparatuses, or the different microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case. The all content and operations/steps refer to: all content and operations, or all content and steps. The operations/steps refer to: operations or steps.

It may be understood that the terms "first", "second", and the like used in this application may be used for describing various concepts in this specification. However, the concepts are not limited by the terms unless otherwise specified. The terms are merely used for distinguishing one concept from another concept. For example, without departing from the scope of this application, a first QoS parameter may be referred to as a second QoS parameter, and similarly, a second QoS parameter may be referred to as a first QoS parameter.

Figure 1:
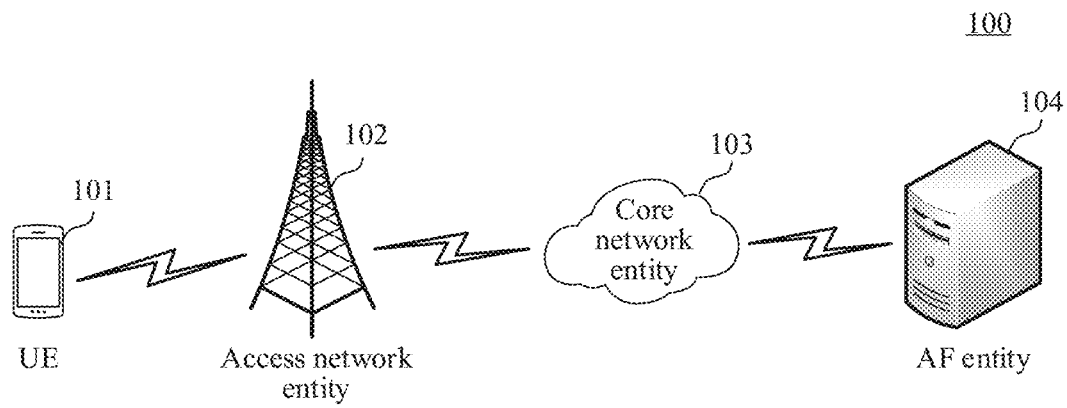
FIG. 1 is a schematic diagram of an exemplary system architecture to which a technical solution according to an embodiment of this application is applicable.

FIG. 1 is a schematic diagram of an exemplary system architecture to which a technical solution according to an embodiment of this application is applicable.

As shown in FIG. 1, a system architecture 100 may include a user equipment (UE) 101 (the UE 101 may be a smartphone shown in FIG. or may be a tablet computer, a portable computer, a desktop computer, or the like), an access network entity 102, a core network entity 103, and an AF entity 104.

It is to be understood that FIG. 1 shows merely illustrative quantities of UEs 101, access network entities 102, core network entities 103, and AF entities 104. There may be any quantities of UEs, access network entities, core network entities, and AF entities according to an actual requirement.

In an embodiment of this application, the core network entity 103 may obtain QoS information configured by the AF entity 104 for a sidelink. The QoS information may include a service level requirement, a QoS model (for example, a per-flow QoS model or a per-packet QoS model), and the like. After obtaining the QoS information, the core network entity 103 establishes a PDU session for the sidelink when determining, according to the QoS information, that the AF entity 104 sets a per-flow QoS model for the sidelink, and generates a sidelink per-flow QoS parameter according to the QoS information.

In an embodiment of this application, the PDU session established by the core network entity 103 for the sidelink includes a user plane PDU session and a control plane PDU session for the sidelink. In addition, the sidelink per-flow QoS parameter generated by the core network entity 103 includes a QoS parameter for the access network entity 102 and a QoS parameter for the UE 101.

In an embodiment of this application, after generating the sidelink per-flow QoS parameter, the core network entity 103 may configure the QoS parameter for the access network entity 102 on the access network entity 102, and configure the QoS parameter for the UE 101 on the UE 101 through NAS signaling.

In an embodiment of this application, after obtaining QoS parameter information configured by the core network entity 103, the access network entity 102 may configure sidelink per-flow QoS parameter information for the UE 101 according to the QoS parameter information. After obtaining the sidelink per-flow QoS parameter (the QoS parameter is configured through a NAS and may include a policy-related parameter such as a service priority parameter or a routing parameter) configured by the core network entity 103 and the sidelink per-flow QoS parameter information (the QoS parameter information is configured through an AS and may include resource scheduling mode information) configured 1w the access network entity 102, the UE 101 may perform sidelink communication accordingly.

A QoS mechanism can allocate and schedule resources according to requirements on QoS to provide different QoS, thereby enhancing predictability of network performance, properly and effectively allocating network resources, and reducing network latencies and network congestion. It may be seen that in the technical solutions of this application, a per-flow QoS mechanism can be implemented on the sidelink through cooperation of the core network entity, the access network entity, and the UE, thereby effectively improving effectiveness and reliability of communication on the sidelink and meeting service requirements of sidelink communication.

The implementation details of the technical solutions in the embodiments of this application are described below.

Figure 2:
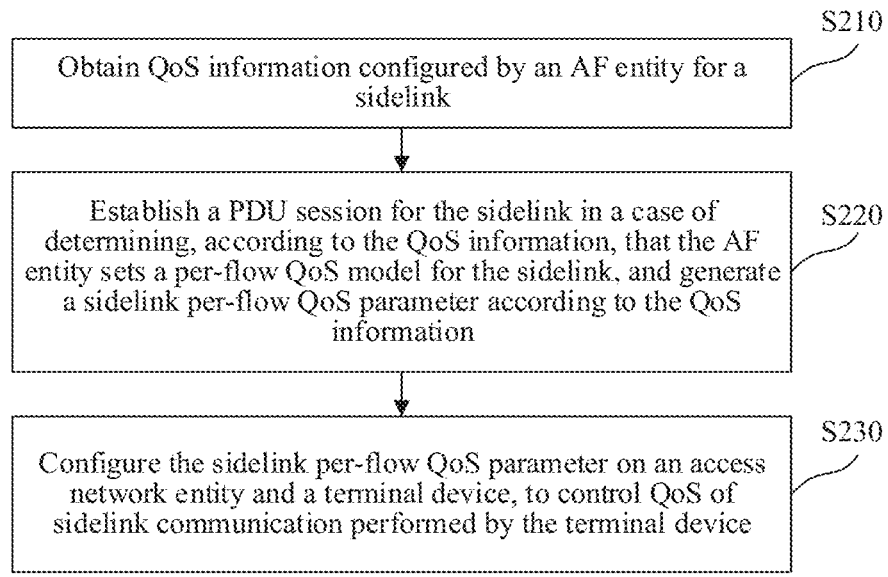
FIG. 2 is a flowchart of a method for controlling QoS of sidelink communication according to an embodiment of this application.

FIG. 2 is a flowchart of a method for controlling QoS of sidelink communication according to an embodiment of this application. The method for controlling QoS of sidelink communication may be performed by the core network entity 103 in FIG. 1. Referring to FIG. 2, the method for controlling QoS of sidelink communication includes at least step S210 to step S230. A description is as follows:

Step S210. Obtain QoS information configured by an AF entity for a sidelink.

In an embodiment of this application, the QoS information configured by the AF entity for the sidelink may include a service level requirement, a QoS model, and the like. The QoS model may be a per-flow QoS model, a per-packet QoS model, or a priority-based. QoS model.

In an embodiment of this application, the core network entity may include a PCF entity. The PCF entity may obtain the QoS information for the sidelink from the AF entity. This case applies to a scenario where the PCF entity and the AF entity are in the same trusted domain.

In an embodiment of this application, the core network entity may include a PCF entity and a network exposure function (NEF) entity. The NEF entity may obtain the QoS information for the sidelink from the AF entity, and forward the QoS information to the PCF entity. This case applies to a scenario where the PCF entity and the AF entity are in different trusted domains.

Step S220, Establish a PDU session for the sidelink when determining, according to the QoS information, that the AF entity sets a per-flow QcoS model for the sidelink, and generate a sidelink per-flow QoS parameter according to the QoS information.

In an embodiment of this application, because a QoS flow is the smallest granularity that provides QoS differentiation in a PDU session, when it is determined that the AF entity sets a per-flow QoS model for the sidelink, a PDU session for the sidelink needs to be established, and then sidelink per-flow QoS parameter information is generated.

In an embodiment of this application, the PDU session established by the core network entity for the sidelink may include a user plane PDU session for the sidelink and a control plane PDU session for the sidelink. The user plane PDU session is used for performing sidelink communication between terminal devices, and the control plane PDU session is used for performing communication between the core network entity and a terminal device. In this case, the generated sidelink per-flow QoS parameter may include a QoS flow parameter of the user plane PDU session and a QoS flow parameter of the control plane PDU session.

In an embodiment of this application, when establishing the user plane PDU session for the sidelink the core network entity may generate a user plane PDU session parameter for the sidelink, and configure the user plane PDU session parameter on the terminal device, for the terminal device to establish the user plane PDU session for the sidelink according to the user plane PDU session parameter.

In an embodiment of this application, the sidelink per-flow QoS parameter generated by the core network entity according to the QoS information may include a QoS parameter for an access network entity and a QoS parameter for the terminal device. The QoS parameter for the terminal device may include a policy-related parameter such as a service priority parameter or a routing parameter.

In an embodiment of this application, the QoS parameter generated by the core network entity for the access network entity may include a resource scheduling mode to be used by the access network entity for the terminal device, and a QoS requirement corresponding to the resource scheduling made.

The resource scheduling mode may include a scheduling mode, a semi-persistent scheduling (SPS) mode, a resource pool mode, a grant free mode, and the like. The QoS requirement corresponding to the resource scheduling mode include a bandwidth requirement, a latency requirement, a reliability requirement, and the like.

In an embodiment of this application, the QoS parameter generated by the core network entity for the access network entity may include QoS requirement information (for example, latency requirement information, packet loss rate requirement information, and bandwidth requirement information) for the sidelink, and the access network entity needs to determine a resource scheduling mode for the terminal device and a QoS requirement corresponding to the resource scheduling mode according to the QoS requirement information. Similarly, the resource scheduling mode determined by the access network entity may include a scheduling mode, an SPS mode, a resource pool mode, a grant free mode, and the like. The QoS requirement corresponding to the resource scheduling mode include a bandwidth requirement, a latency requirement, a reliability requirement, and the like.

Still refer to FIG. 2. Step S230. Configure the sidelink per-flow QoS parameter on the access network entity and the terminal device, to control QoS of sidelink communication performed by the terminal device.

In an embodiment of this application, if the sidelink per-flow QoS parameter generated by the core network entity includes the QoS parameter for the access network entity and the QoS parameter for the terminal device, the core network entity may configure the QoS parameter for the access network entity on the access network entity, and configure the QoS parameter for the terminal device on the terminal device through NAS signaling. The configuring, by the core network entity, the QoS parameter for the access network entity on the access network entity may be communicating, by an access and mobility management function (AMF) entity, with the access network entity, and then configuring the QoS parameter on the access network entity.

In the technical solution of the embodiment shown in FIG. 2, a per-flow QoS mechanism can be implemented on a sidelink, thereby effectively improving effectiveness and reliability of communication on the sidelink and meeting service requirements of sidelink communication.

Figure 3:
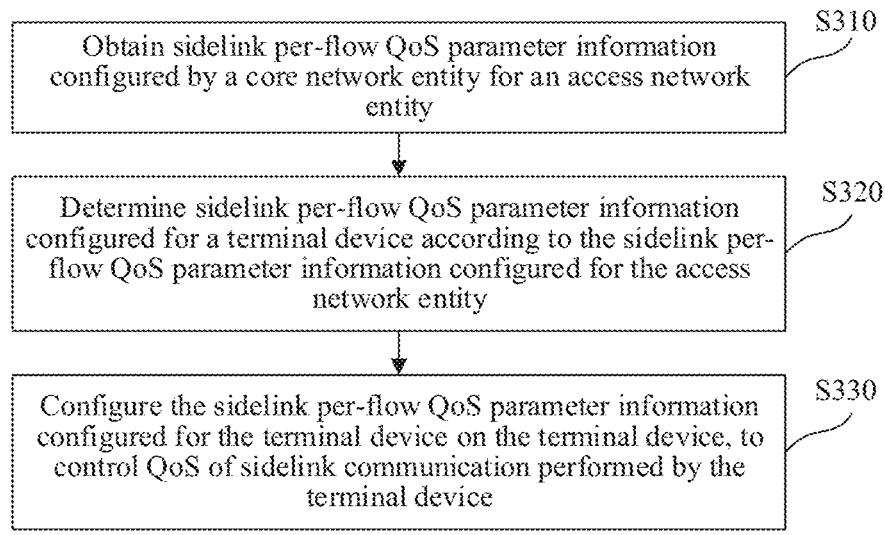
FIG. 3 is a flowchart of a method for controlling QoS of sidelink communication according to an embodiment of this application.

FIG. 3 is a flowchart of a method for controlling QoS of sidelink communication according to an embodiment of this application. The method for controlling QoS of sidelink communication may be performed by the access network entity 102 in FIG. 1. Referring to FIG. 3, the method for controlling QoS of sidelink communication includes at least step S310 to step S330. A description is as follows:

Step S310. Obtain sidelink per-flow QoS parameter information configured by a core network entity for the access network entity.

In an embodiment of this application, the sidelink per-flow QoS parameter information configured by the core network entity for the access network entity may include a resource scheduling mode to be used by the access network entity for a terminal device, and a QoS requirement corresponding to the resource scheduling mode.

In an embodiment of this application, the sidelink per-flow QoS parameter information configured by the core network entity for the access network entity may include per-flow QoS requirement information (for example, latency requirement information, packet loss rate requirement information, and bandwidth requirement information) for the sidelink, and the access network entity may determine a resource scheduling mode for the terminal device and a QoS requirement corresponding to the resource scheduling mode according to the QoS requirement information.

Step S320, Determine sidelink per-flow QoS parameter information configured for the terminal device according to the sidelink per-flow QoS parameter information configured for the access network entity.

In an embodiment of this application, the access network entity may determine the resource scheduling mode for the terminal device to perform sidelink communication and the QoS requirement corresponding to the resource scheduling mode according to the sidelink per-flow QoS parameter information configured by the core network entity for the access network entity, and generate the sidelink per-flow QoS parameter information configured for the terminal device according to the resource scheduling mode and the QoS requirement corresponding to the resource scheduling mode.

In an embodiment of this application, the sidelink per-flow QoS parameter information configured for the terminal device that is generated by the access network entity may include resource scheduling information and the like, for example, time-frequency resource information allocated to the terminal device and scheduling period information.

Still refer to FIG. 3. Step S330. Configure the sidelink per-flow QoS parameter information configured for the terminal device on the terminal device, to control QoS of sidelink communication performed by the terminal device.

In an embodiment of this application, the access network entity may configure the sidelink per-flow QoS parameter information configured for the terminal device on the terminal device through AS signaling. For example, the sidelink per-flow QoS parameter information configured for the terminal device may be configured on the terminal device through radio resource control (RRC) signaling, media access control (MAC) signaling, or the like.

Figure 4:
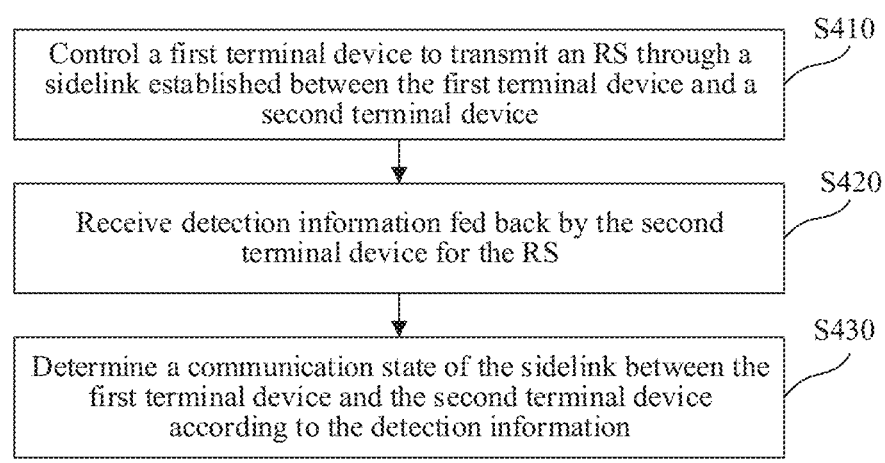
FIG. 4 is a flowchart of an access network entity controlling a terminal device to perform access stratum (AS) monitoring on a sidelink according to an embodiment of this application.

Based on the technical solution of the embodiment shown in FIG. 3, in an embodiment of this application, the access network entity may further control the terminal device to perform AS monitoring on a sidelink. For example, as shown in FIG. 4, in an embodiment of this application, a process that the access network entity controls the terminal device to perform AS monitoring on a sidelink may include the following steps:

Step S410. Control a first terminal device to transmit an RS through a sidelink established between the first terminal device and a second terminal device.

In an embodiment of this application, the RS may be a "pilot" signal, which may be a known signal provided by a transmitter to a receiver for channel estimation or channel detection. Optionally, the access network entity may control the first terminal device to transmit the RS through the sidelink established between the first terminal device and the second terminal device when no data is transmitted between the first terminal device and the second terminal device, so that the RS is received by the second terminal device, and a communication state of the sidelink is evaluated according to the RS.

Step S420. Receive detection information fed back by the second terminal device for the RS.

In an embodiment of this application, after detecting the RS transmitted by the first terminal device, the second terminal device may feedback the detection information for the RS to the access network entity, so that the access network entity obtains the communication state of the sidelink established between the first terminal device and the second terminal device.

Step S430. Determine the communication state of the sidelink between the first terminal device and the second terminal device according to the detection information.

In an embodiment of this application, the communication state of the sidelink between the first terminal device and the second terminal device may be used for evaluating communication quality between the first terminal device and the second terminal device. If the communication state of the sidelink between the first terminal device and the second terminal device is relatively poor, maintenance may be performed in time to prevent the communication between the first terminal device and the second terminal device from being affected.

Based on the technical solution of the embodiment shown in FIG. 4, in an embodiment of this application, the access network entity array further maintain the sidelink according to a result of monitoring the sidelink by the terminal device. For example, if the access network entity determines that the communication state of the sidelink deteriorates according to the communication state of the sidelink, the access network entity may reconfigure a sidelink between the first terminal device and the second terminal device, for example, change a communication frequency between the first terminal device and the second terminal device, to re-establish a sidelink for communication. In another example, if the access network entity determines that the sidelink is no longer suitable for data transmission according to the communication state of the sidelink, the access network entity may release the sidelink between the first terminal device and the second terminal device, to reduce resource occupation.

Figure 5:
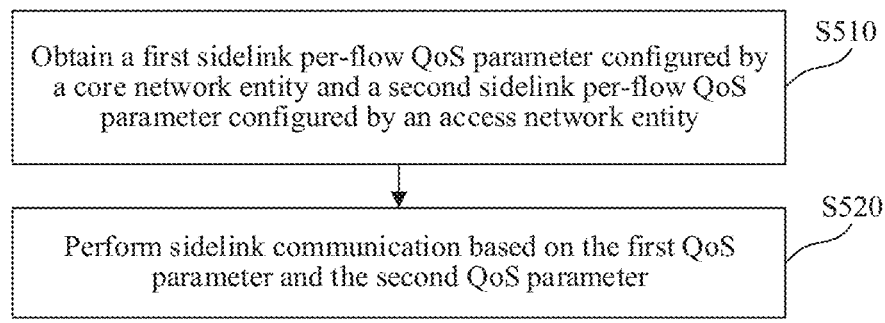
FIG. 5 is a flowchart of a method for controlling QoS of sidelink communication according to an embodiment of this application.

FIG. 5 is a flowchart of a method for controlling QoS of sidelink communication according to an embodiment of this application. The method for controlling QoS of sidelink communication may be performed by a terminal device, for example, may be performed by the UE 101 in FIG. 1. Referring to FIG. 5, the method for controlling QoS of sidelink communication includes at least step S510 and step S520. A description is as follows:

Step S510. Obtain a first sidelink per-flow QoS parameter configured by a core network entity and a second sidelink per-flow QoS parameter configured by an access network entity.

In an embodiment of this application, the terminal device may obtain, through NAS signaling, the first sidelink per-flow QoS parameter configured by the core network entity, and obtain, through AS signaling, the second sidelink per-flow QoS parameter configured by the access network entity. The first QoS parameter may include a policy-related parameter such as a service priority parameter or a routing parameter. The second QoS parameter may include resource scheduling information such as time-frequency resource information allocated to the terminal device and scheduling period information.

Step S520. Perform sidelink communication based on the first QoS parameter and the second QoS parameter.

In an embodiment of this application, in a process of performing sidelink communication based on the first QoS parameter and the second QoS parameter, the terminal device may detect a communication peer according to identification information of the communication peer, and perform sidelink communication with the communication peer based on the first QoS parameter and the second QoS parameter when detecting that the communication peer is within a communication range. In this way, a case that communication data is still transmitted though the communication peer is outside the communication range, and causes interference to communication of another surrounding terminal device may be avoided.

In an embodiment of this application, the terminal device may further perform AS monitoring and/or maintenance processing on a sidelink based on control information of the access network entity. For a process of monitoring and maintenance processing, refer to the foregoing embodiment related to the access network entity, and details are not described herein again. The AS monitoring and/or maintenance processing refers to AS monitoring, AS maintenance processing, or AS monitoring and maintenance processing.

In the technical solution of the embodiment shown in FIG. 5, a per-flow QoS mechanism can be implemented on a sidelink, thereby effectively improving effectiveness and reliability of communication on the sidelink and meeting service requirements of sidelink communication.

The above describes the technical solutions of the method for controlling QoS of sidelink communication of the embodiments of this application from perspectives of the core network entity, the access network entity, and the terminal device, and the following describes the implementation details of the technical solutions of the embodiments of this application by using an example in which the terminal device is a V2X terminal and the access network entity is a base station.

Figure 6:
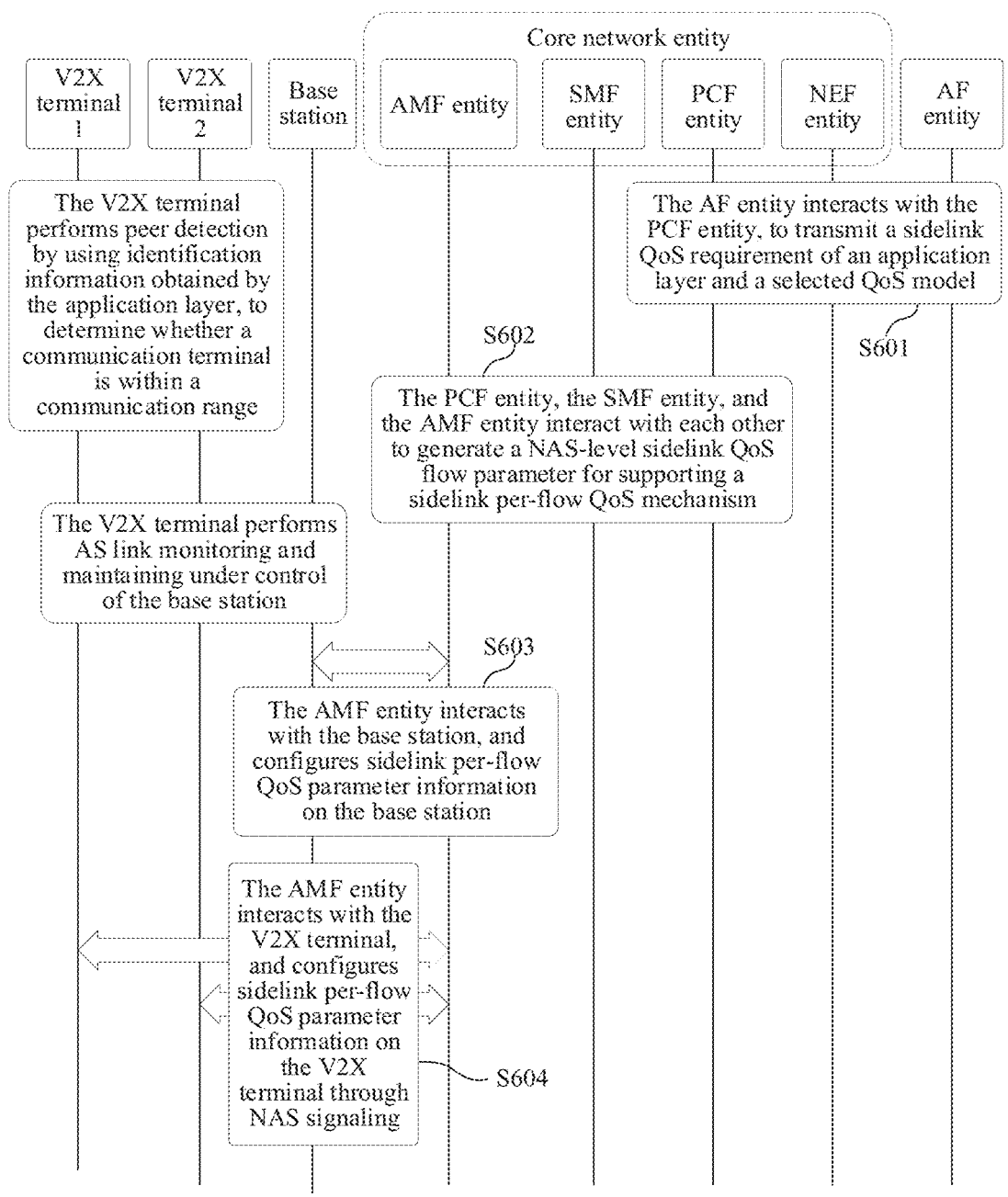
FIG. 6 is a flowchart of a method for controlling QoS of sidelink communication according to an embodiment of this application.

As shown in FIG. 6, a method for controlling QoS of sidelink communication according to an embodiment of this application includes the following steps:

Step S601. An AF entity interacts with a PCF entity, to transmit a sidelink QoS requirement of an application layer and a selected QoS model.

Figure 7:
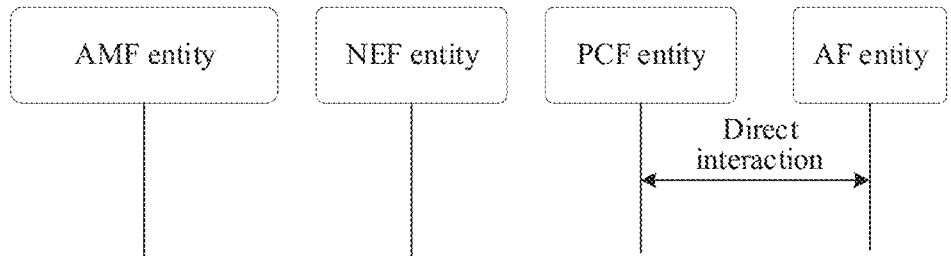
FIG. 7 is a schematic diagram of an interaction process between an AF entity and a policy control function (PCF) entity according to an embodiment of this application.

In an embodiment of this application, as shown in FIG. 7, an interaction process between the AF entity and the PCF entity may be that the AF entity directly interacts with the PCF entity, to transmit the sidelink QoS requirement and the selected QoS model. The technical solution of this embodiment is applicable to an application scenario where the AF entity and the PCF entity are in the same trusted domain, such as a scenario where a network operator itself deploys the AF entity.

Figure 8:
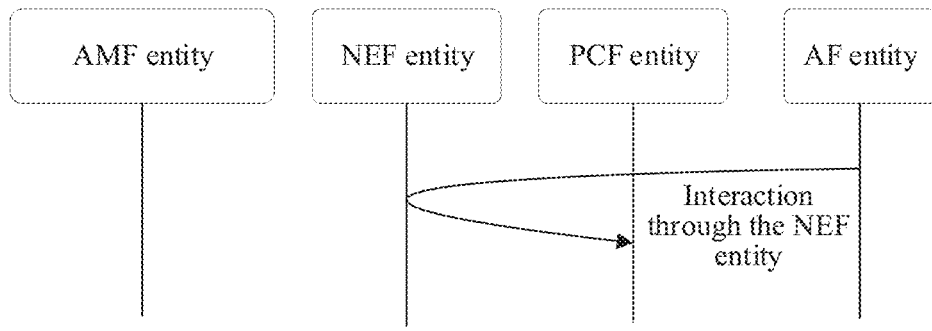
FIG. 8 is a schematic diagram of another interaction process between an AF entity and a PCF entity according to an embodiment of this application.

In an embodiment of this application, as shown in FIG. 8, an interaction process between the AF entity and the PCF entity may be that the AF entity interacts with the PCF entity through an NEF entity, to transmit the sidelink QoS requirement and the selected QoS model. The technical solution of this embodiment is applicable to an application scenario where the AF entity and the PCF entity are in different trusted domains, such as a scenario where a third party deploys the AF entity.

Step S602. The PCF entity, a session management function (SMF) entity, and an AMF entity interact with each other to generate a NAS-level sidelink QoS flow parameter for supporting a sidelink per-flow QoS mechanism.

In an embodiment of this application, in step S602, a corresponding PDU session and a QoS flow may be established for a sidelink per-flow QoS characteristic. The SMF entity may generate a corresponding PDU session parameter for the sidelink per-flow QoS characteristic, and establish the PDU session based on the PDU session parameter, the PDU session parameter including a user plane PDU session parameter and a control plane PM session parameter.

In an embodiment of this application, the generated NAS-level sidelink QoS flow parameter includes a sidelink QoS flow parameter for an access network entity and the sidelink QoS flow parameter for a V2X terminal.

Step S603. The AMF entity interacts with a base station, and configures sidelink per-flow QoS parameter information on the base station.

In an embodiment of this application, after the AMF entity configures the sidelink per-flow QoS parameter information on the base station, the base station interacts with the V2X terminal, to configure sidelink per-flow QoS parameter information such as resource scheduling information on the V2X terminal through AS signaling.

Step S604. The AMF entity interacts with the V2X terminal, and configures the sidelink per-flow QoS parameter information on the V2X terminal through NAS signaling.

In an embodiment of this application, the sidelink per-flow QoS parameter information configured by the AMF entity on the V2X terminal may include a policy-related parameter such as a service priority parameter or a routing parameter.

A sequence of performing step S603 and step S604 shown in FIG. 6 may be that step S603 is performed before step S604 as shown in FIG. 6, or step S604 is performed before step S603, or step S603 and step S604 are performed simultaneously.

Moreover, still referring to FIG. 6, the V2X terminal may perform peer detection by using identification information obtained by the application layer, to determine whether a communication terminal is within a communication range. When it is determined that the communication terminal is within the communication range, data is transmitted to the communication terminal. In addition, the V2X terminal may perform AS link monitoring and maintaining under control of the base station.

In the application scenario shown in FIG. 6, the technical solutions of the embodiments of this application enables a communication system (for example, a 5G system) to support a per-flow QoS model on a sidelink, to better support V2X communication (for example, vehicle-vehicle communication and vehicle-human communication), thereby effectively improving effectiveness and reliability of communication on the sidelink. Certainly, in another application scenario such as an end-to-end game scenario that needs sidelink communication, the technical solutions of the embodiments of this application may also be applied.

The following describes apparatus embodiments of this application, which may be used for performing the method for controlling QoS of sidelink communication in the foregoing embodiments of this application. For details that are not disclosed in the apparatus embodiments of this application, refer to the method for controlling QoS of sidelink communication in the foregoing embodiments of this application.

Figure 9:
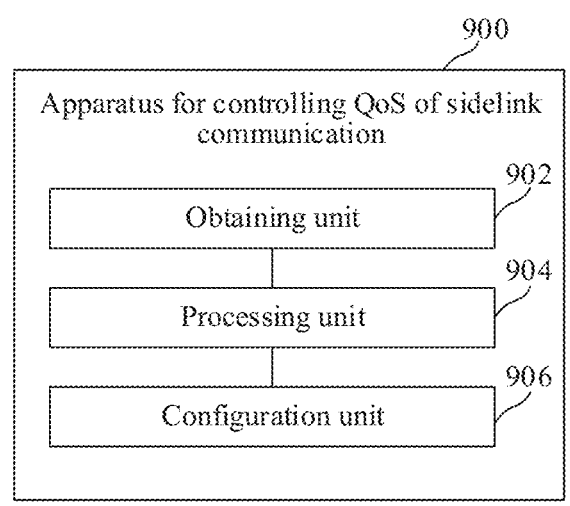
FIG. 9 is a block diagram of an apparatus for controlling QoS of sidelink communication according to an embodiment of this application.

FIG. 9 is a block diagram of an apparatus for controlling QoS of sidelink communication according to an embodiment of this application.

Referring to FIG. 9, an apparatus 900 for controlling QoS of sidelink communication according to an embodiment of this application includes: an obtaining unit 902, a processing unit 904, and a configuration unit 906.

The obtaining unit 902 is configured to obtain QoS information configured by an AF entity for a sidelink. The processing unit 904 is configured to establish a PDU session for the sidelink when determining, according to the QoS information, that the AF entity sets a per-flow QoS model for the sidelink, and generate a sidelink per-flow QoS parameter according to the QoS information. The configuration unit 906 is configured to configure the sidelink per-flow QoS parameter on an access network entity and a terminal device, to control QoS of sidelink communication performed by the terminal device.

In some embodiments of this application, the processing unit 904 is configured to establish a user plane PDU session and a control plane PDU session for the sidelink, the user plane PDU session being used for performing sidelink communication between terminal devices, and the control plane PDU session being used for performing communication between the core network entity and the terminal device.

In some embodiments of this application, the processing unit 904 is configured to generate a user plane PDU session parameter for the sidelink; and configure the user plane PDU session parameter on the terminal device, for the terminal device to establish the user plane PDU session for the sidelink according to the user plane PDU session parameter.

In some embodiments of this application, the sidelink per-flow QoS parameter includes a QoS parameter for the access network entity and a QoS parameter for the terminal device; and the configuration unit 906 is configured to configure the QoS parameter for the access network entity on the access network entity, and configure the QoS parameter for the terminal device on the terminal device through NAS signaling.

Figure 10:
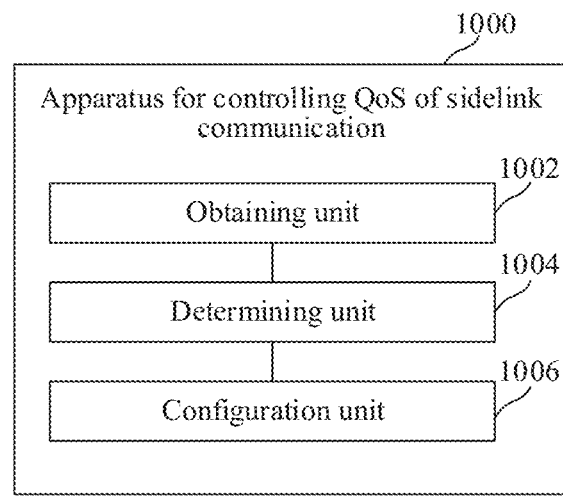
FIG. 10 is a block diagram of an apparatus for controlling QoS of sidelink communication according to an embodiment of this application.

In some embodiments of this application, the QoS parameter for the access network entity includes: a resource scheduling mode to be used by the access network entity for the terminal device, and a QoS requirement corresponding to the resource scheduling mode; or QoS requirement information for the sidelink, the QoS requirement information being used for the access network entity to determine a resource scheduling mode for the terminal device and a QoS requirement corresponding to the resource scheduling mode, FIG. 10 is a block diagram of an apparatus for controlling QoS of sidelink communication according to an embodiment of this application.

Referring to FIG. 10, an apparatus 1000 for controlling QoS of sidelink communication according to an embodiment of this application includes: an obtaining unit 1002, a determining unit 1004, and a configuration unit 1006.

The obtaining unit 1002 is configured to obtain sidelink per-flow QoS parameter information configured by a core network entity for an access network entity. The determining unit 1004 is configured to determine sidelink per-flow QoS parameter information configured for a terminal device according to the sidelink per-flow QoS parameter information configured for the access network entity. The configuration unit 1006 is configured to configure the sidelink per-flow QoS parameter information configured for the terminal device on the terminal device, to control QoS of sidelink communication performed by the terminal device.

In some embodiments of this application, the determining unit 1004 is configured to determine a resource scheduling mode for the terminal device to perform sidelink communication and a QoS requirement corresponding to the resource scheduling mode according to the sidelink per-flow QoS parameter information configured for the access network entity; and generate the sidelink per-flow QoS parameter information configured for the terminal device according to the resource scheduling mode and the QoS requirement corresponding to the resource scheduling mode.

In some embodiments of this application, the determining unit 1004 is configured to obtain the resource scheduling mode and the QoS requirement corresponding to the resource scheduling mode from the sidelink per-flow QoS parameter information configured for the access network entity; or generate the resource scheduling mode and the QoS requirement corresponding to the resource scheduling mode according to sidelink per-flow QoS requirement information included in the sidelink per-flow QoS parameter information configured for the access network entity.

In some embodiments of this application, the apparatus 1000 for controlling QoS of sidelink communication further includes: a control unit, configured to control the terminal device to perform AS monitoring on a sidelink.

In some embodiments of this application, the control unit is configured to control a first terminal device to transmit an RS through a sidelink established between the first terminal device and a second terminal device; receive detection information fed back by the second terminal device for the RS; and determine a communication state of the sidelink between the first terminal device and the second terminal device according to the detection information.

In some embodiments of this application, the apparatus 1000 for controlling QoS of sidelink communication further includes: a maintenance unit, configured to maintain the sidelink according to a result of monitoring the sidelink by the terminal device.

In some embodiments of this application, the maintenance unit is configured to reconfigure a sidelink between the first terminal device and the second terminal device when determining that the communication state of the sidelink between the first terminal device and the second terminal device deteriorates according to the communication state; and release the sidelink between the first terminal device and the second terminal device when determining that the sidelink is no longer suitable for data transmission according to the communication state.

Figure 11:
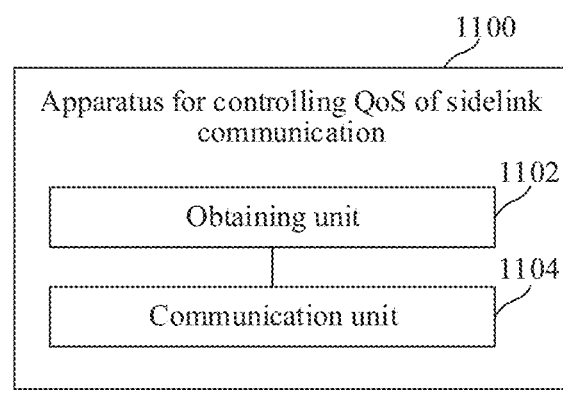
FIG. 11 is a block diagram of an apparatus for controlling QoS of sidelink communication according to an embodiment of this application.

FIG. 11 is a block diagram of an apparatus for controlling QoS of sidelink communication according to an embodiment of this application.

Referring to FIG. 11, an apparatus 1100 for controlling QoS of sidelink communication according to an embodiment of this application includes: an obtaining unit 1102 and a communication unit 1104.

The obtaining unit 1102 is configured to obtain a first sidelink per-flow QoS parameter configured by a core network entity and a second sidelink per-flow QoS parameter configured by an access network entity. The communication unit 1104 is configured to perform sidelink communication based on the first QoS parameter and the second QoS parameter.

In some embodiments of this application, the communication unit 1104 is configured to detect a communication peer according to identification information of the communication peer; and perform sidelink communication with the communication peer based on the first QoS parameter and the second QoS parameter when detecting that the communication peer is within a communication range.

In some embodiments of this application, the apparatus 1100 for controlling QoS of sidelink communication further includes: a processing unit, configured to perform AS monitoring and/or maintenance processing on a sidelink based on control information of the access network entity.

Figure 12:
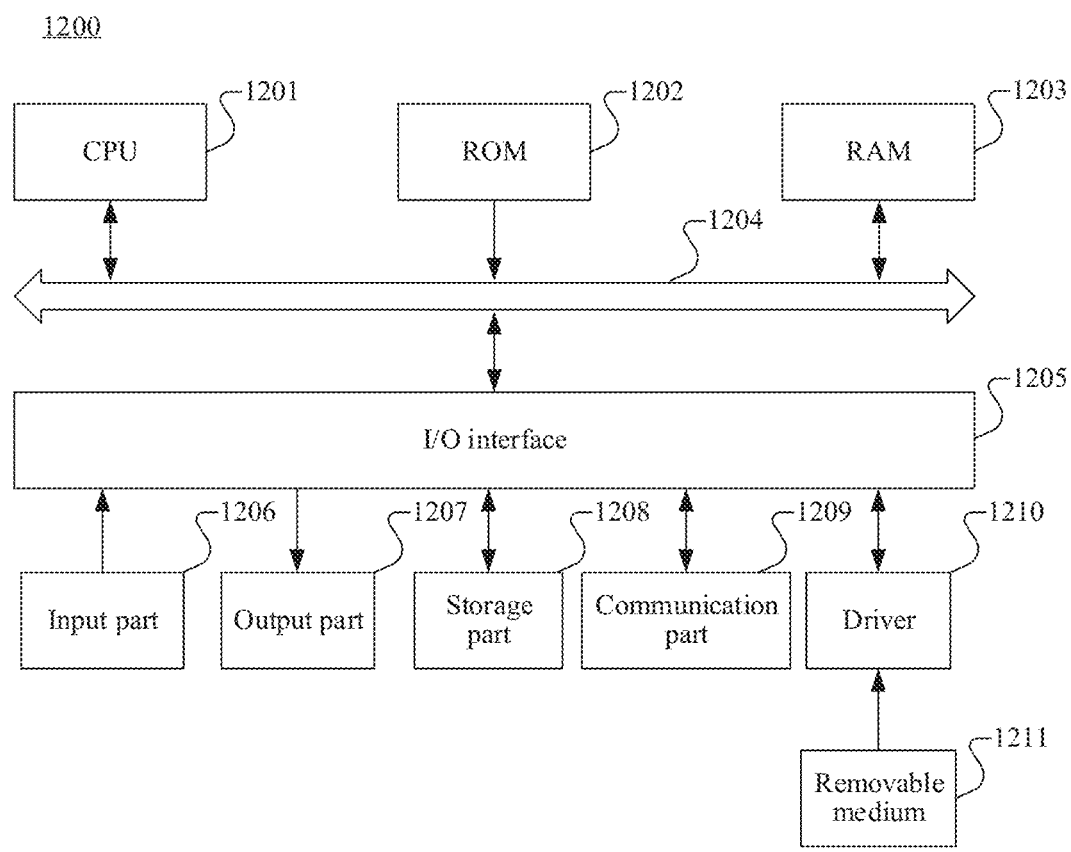
FIG. 12 is a schematic structural diagram of a computer system adapted to implement an electronic device according to an embodiment of this application.

FIG. 12 is a schematic structural diagram of a computer system adapted to implement an electronic device according to an embodiment of this application.

The computer system 1200 of the electronic device shown in FIG. 12 is merely an example, and does not constitute any limitation on functions and use ranges of the embodiments of this application.

As shown in FIG. 12, the computer system 1200 includes a central processing unit (CPU) 1201, which may perform various suitable actions and processing based on a program stored in a read-only memory (ROM) 1202 or a program loaded from a storage part 1208 into a random access memory (RAM) 1203, for example, perform the method described in the foregoing embodiments. The RAM 1203 further stores various programs and data required for system operations. The CPU 1201, the ROM 1202, and the RAM 1203 are connected to each other through a bus 1204. An input/output (UO) interface 1205 is also connected to the bus 1204.

The following components are connected to the I/O interface 1205: an input part 1206 including a keyboard, a mouse, or the like, an output part 1207 including a cathode ray tube (CRT), a liquid crystal display (LCD), a speaker, or the like, a storage part 1208 including a hard disk, or the like, and a communication part 1209 including a network interface card such as a local area network (LAN) card or a modem. The communication part 1209 performs communication processing through a network such as the Internet. A driver 1210 is also connected to the I/O interface 1205 as required. A removable medium 1211, such as a magnetic disk, an optical disc, a magneto-optical disk, or a semiconductor memory, is installed on the driver 1210 as required, so that a computer program read from the removable median is installed into the storage part 1208 as required.

In some embodiments of this application, the electronic device may be a core network entity, an access network entity, or a terminal device, or the like.

In some embodiments of this application, a core network entity is provided, including:
one or more processors; and
a storage apparatus, configured to store one or more programs, the one or more programs, when executed by the one or more processors, causing the one or more processors to implement the following operations:
obtaining QoS information configured by an AF entity for a sidelink;
establishing a PDU session for the sidelink when determining, according to the QoS information, that the AF entity sets a per-flow QoS model for the sidelink, and generating a sidelink per-flow QoS parameter according to the QoS information; and
configuring the sidelink per-flow QoS parameter on an access network entity and a terminal device, to control QoS of sidelink communication performed by the terminal device.

In some embodiments of this application, the one or more programs, when executed by the one or more processors, cause the one or more processors to implement the following operation:
establishing a user plane PDU session and a control plane PDU session for the sidelink, the user plane PDU session being used for performing sidelink communication between terminal devices, and the control plane PDU session being used for performing communication between the core network entity and the terminal device.

In some embodiments of this application, the one or more programs, when executed by the one or more processors, cause the one or more processors to implement the following operations:
generating a user plane PDU session parameter for the sidelink: and
configuring the user plane PDU session parameter on the terminal device, for the terminal device to establish the user plane PDU session for the sidelink according to the user plane PDU session parameter.

In some embodiments of this application, the sidelink per-flow QoS parameter includes a QoS parameter for the access network entity and a QoS parameter for the terminal device; and the one or more programs, when executed by the one or more processors, cause the one or more processors to implement the following operation:

configuring the QoS parameter for the access network entity on the access network entity, and configuring the QoS parameter for the terminal device on the terminal device through NAS signaling.

In some embodiments of this application, the QoS parameter for the access network entity includes:

a resource scheduling mode to be used by the access network entity for the terminal device, and a QoS requirement corresponding to the resource scheduling mode; or QoS requirement information for the sidelink, the QoS requirement information being used for the access network entity to determine a resource scheduling mode for the terminal device and a QoS requirement corresponding to the resource scheduling mode.

In some embodiments of this application, an access network entity is provided, including:

one or more processors; and a storage apparatus, configured to store one or more programs, the one or more programs, when executed by the one or more processors, causing the one or more processors to implement the following operations:

obtaining sidelink per-flow QoS parameter information configured by a core network entity for the access network entity;

determining sidelink per-flow QoS parameter information configured for a terminal device according to the sidelink per-flow QoS parameter information configured for the access network entity; and configuring the sidelink per-flow QoS parameter information configured for the terminal device on the terminal device, to control QoS of sidelink communication performed by the terminal device.

In some embodiments of this application, the one or more programs, when executed by the one or more processors, cause the one or more processors to implement the following operations:

determining a resource scheduling mode for the terminal device to perform sidelink communication and a QoS requirement corresponding to the resource scheduling mode according to the sidelink per-flow QoS parameter information configured for the access network entity; and generating the sidelink per-flow QoS parameter information configured for the terminal device according to the resource scheduling mode and the QoS requirement corresponding to the resource scheduling mode.

In some embodiments of this application, the one or more programs, when executed by the one or more processors, cause the one or more processors to implement the following operation:

obtaining the resource scheduling mode and the QoS requirement corresponding to the resource scheduling mode from the sidelink per-flow QoS parameter information configured for the access network entity; or generating the resource scheduling mode and the QoS requirement corresponding to the resource scheduling mode according to sidelink per-flow QoS requirement information included in the sidelink per-flow QoS parameter information configured for the access network entity.

In some embodiments of this application, the one or more programs, when executed by the one or more processors, cause the one or more processors to implement the following operation:

controlling the terminal device to perform AS monitoring on a sidelink.

In some embodiments of this application, the one or more programs, when executed by the one or more processors, cause the one or more processors to implement the following operations:

controlling a first terminal device to transmit an RS through a sidelink established between the first terminal device and a second terminal device;

receiving detection information fed back by the second terminal device for the RS; and determining a communication state of the sidelink between the first terminal device and the second terminal device according to the detection information.

In some embodiments of this application, the one or more programs, when executed by the one or more processors, cause the one or more processors to implement the following operation:

maintaining the sidelink according to a result of monitoring the sidelink by the terminal device.

In some embodiments of this application, the one or more programs, when executed by the one or more processors, cause the one or more processors to implement the following operations:

reconfiguring a sidelink between the first terminal device and the second terminal device when determining that the communication state of the sidelink between the first terminal device and the second terminal device deteriorates according to the communication state; and releasing the sidelink between the first terminal device and the second terminal device when determining that the sidelink is no longer suitable for data transmission according to the communication state.

In some embodiments of this application, a terminal device is provided, including:

one or more processors; and a storage apparatus, configured to store one or more programs, the one or more programs, when executed by the one or more processors, causing the one or more processors to implement the following operations:

obtaining a first sidelink per-flow QoS parameter configured by a core network entity and a second sidelink per-flow QoS parameter configured by an access network entity; and performing sidelink communication based on the first QoS parameter and the second QoS parameter.

In some embodiments of this application, the one or more programs, when executed by the one or more processors, cause the one or more processors to implement the following operations:

detecting a communication peer according to identification information of the communication peer; and performing sidelink communication with the communication peer based on the first QoS parameter and the second QoS parameter when detecting that the communication peer is within a communication range.

In some embodiments of this application, the one or more programs, when executed by the one or more processors, cause the one or more processors to implement the following operation:

performing AS monitoring and/or maintenance processing on a sidelink based on control information of the access network entity.

Particularly, according to an embodiment of this application, the processes described in the following by referring to the flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed from a network through the communication part 1209, and/or installed from the removable medium 1211. When the computer program is executed by the CPU 1201, the various functions defined in the system of this application are executed.

The computer-readable medic n shown in the embodiments of this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. An example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, apparatus, or device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Related units described in the embodiments of this application may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

In some embodiments of this application, a computer-readable medium is provided, storing a computer program, the computer program, when executed by a processor, implementing the following operations:

obtaining QoS information configured by an AF entity for a sidelink;

establishing a PDU session for the sidelink when determining, according to the QoS information, that the AF entity sets a per-flow QoS model for the sidelink, and generating a sidelink per-flow QoS parameter according to the QoS information; and configuring the sidelink per-flow QoS parameter on an access network entity and a terminal device, to control QoS of sidelink communication performed by the terminal device.

In some embodiments of this application, the computer program, when executed by the processor, implements the following operation:

establishing a user plane PDU session and a control plane PDU session for the sidelink, the user plane PDU session being used for performing sidelink communication between terminal devices, and the control plane PDU session being used for performing communication between the core network entity and the terminal device.

In some embodiments of this application, the computer program, when executed by the processor, implements the following operations:

generating a user plane PDU session parameter for the sidelink; and configuring the user plane PDU session parameter on the terminal device, for the terminal device to establish the user plane PDU session for the sidelink according to the user plane PDU session parameter.

In some embodiments of this application, the sidelink per-flow QoS parameter includes a QoS parameter for the access network entity and a QoS parameter for the terminal device; and the computer program, when executed by the processor, implements the following operation:

configuring the QoS parameter for the access network entity on the access network entity, and configuring the QoS parameter for the terminal device on the terminal device through NAS signaling.

In some embodiments of this application, the QoS parameter for the access network entity includes:

a resource scheduling mode to be used by the access network entity for the terminal device, and a QoS requirement corresponding to the resource scheduling mode; or QoS requirement information for the sidelink, the QoS requirement information being used for the access network entity to determine a resource scheduling mode for the terminal device and a QoS requirement corresponding to the resource scheduling mode.

In some embodiments of this application, a computer-readable medium is provided, storing a computer program, the computer program, when executed by a processor, implementing the following operations:

obtaining sidelink per-flow QoS parameter information configured by a core network entity for an access network entity;

determining sidelink per-flow QoS parameter information configured for a terminal device according to the sidelink per-flow QoS parameter information configured for the access network entity; and configuring the sidelink per-flow QoS parameter information configured for the terminal device on the terminal device, to control QoS of sidelink communication performed by the terminal device.

In some embodiments of this application, the computer program, when executed by the processor, implements the following operations:

determining a resource scheduling mode for the terminal device to perform sidelink communication and a QoS requirement corresponding to the resource scheduling mode according to the sidelink per-flow QoS parameter information configured for the access network entity; and generating the sidelink per-flow QoS parameter information configured for the terminal device according to the resource scheduling mode and the QoS requirement corresponding to the resource scheduling mode.

In some embodiments of this application, the computer program, when executed by the processor, implements the following operation:

obtaining the resource scheduling mode and the QoS requirement corresponding to the resource scheduling mode from the sidelink per-flow QoS parameter information configured for the access network entity; or generating the resource scheduling mode and the QoS requirement corresponding to the resource scheduling mode according to sidelink per-flow QoS requirement information included in the sidelink per-flow QoS parameter information configured for the access network entity.

In some embodiments of this application, the computer program, when executed by the processor, implements the following Operation:

controlling the terminal device to perform AS monitoring on a sidelink.

In some embodiments of this application, the computer program, when executed by the processor, implements the following operations:

controlling a first terminal device to transmit an RS through a sidelink established between the first terminal device and a second terminal device;

receiving detection information fed back by the second terminal device for the RS; and determining a communication state of the sidelink between the first terminal device and the second terminal device according to the detection information.

In some embodiments of this application, the computer program, when executed by the processor, implements the following operation:

maintaining the sidelink according to a result of monitoring the sidelink by the terminal device.

In some embodiments of this application, the one or more programs, when executed by the one or more processors, cause the one or more processors to implement the following operations:

reconfiguring a sidelink between the first terminal device and the second terminal device when determining that the communication state of the sidelink between the first terminal device and the second terminal device deteriorates according to the communication state; and releasing the sidelink between the first terminal device and the second terminal device when determining that the sidelink is no longer suitable for data transmission according to the communication state.

In some embodiments of this application, a computer-readable medium is provided, storing a computer program, the computer program, when executed by a processor, implementing the following operations:

obtaining a first sidelink per-flow QoS parameter configured by a core network entity and a second sidelink per-flow QoS parameter configured by an access network entity; and performing sidelink communication based on the first QoS parameter and the second QoS parameter.

In some embodiments of this application, a computer-readable medium is provided, storing a computer program, the computer program, when executed by a processor, implementing the following operations:

detecting a communication peer according to identification information of the communication peer; and performing sidelink communication with the communication peer based on the first QoS parameter and the second QoS parameter when detecting that the communication peer is within a communication range.

In some embodiments of this application, a computer-readable medium is provided, storing a computer program, the computer program, when executed by a processor, implementing the following operation:

performing AS monitoring and/or maintenance processing on a sidelink based on control information of the access network entity.

Although several modules or units of a device for action execution are mentioned in the foregoing detailed descriptions, the division is not mandatory. Actually, according to the implementations of this application, the features and functions of two or more modules or units described above may be specified in one module or unit. Conversely, features and functions of one module or unit described above may be further divided into a plurality of modules or units to be specified. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory), Likewise, a processor (or processors and memory) can be used to implement one or more modules or units. Moreover, each module or unit can be part of an overall module that includes the functionalities of the module or unit.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the embodiments of this application.

After considering the specification and practicing the disclosed embodiments, a person skilled in the art may easily conceive of other implementations of this application. This application is intended to cover any variations, uses, or adaptive changes of this application following the general principles of this application, and includes well-known knowledge and conventional technical means in the art and undisclosed in this application.

It is to be understood that this application is not limited to the precise structures described above and shown in the accompanying drawings, and various modifications and changes may be made without departing from the scope of this application. The scope of this application is subject only to the appended claims.

What is claimed is:

1. A method for controlling quality of service (QOS) of sidelink communication performed at a core network entity, the method comprising:
   obtaining QoS information configured by an application function (AF) entity for a sidelink in a 5G wireless network environment;
   establishing a protocol data unit (PDU) session for the sidelink when determining, according to the QoS information, that the AF entity sets a per-flow QoS model for the sidelink, and generating a sidelink per-flow QoS parameter for the PDU session according to the QoS information, wherein the sidelink per-flow QoS parameter for the PDU session includes a QoS parameter for an access network entity and at least a QoS parameter for a terminal device;
   configuring the QoS parameter for the access network entity on the access network entity, wherein the access network entity is further configured to configure first sidelink per-flow QoS parameter for the terminal device according to the QoS parameter for the access network entity through access stratum (AS) signaling, wherein the first sidelink per-flow QoS parameter comprises time-frequency resource information allocated to the terminal device and scheduling period information; and
   configuring second sidelink per-flow QoS parameter, which comprises a service priority parameter or a routing parameter, for the terminal device on the terminal device through non-access stratum (NAS) signaling, to control QoS of sidelink communication performed by the terminal device with another terminal device directly.

2. The method according to claim 1, wherein the establishing a PDU session for the sidelink comprises:
   establishing a user plane PDU session and a control plane PDU session for the sidelink, the user plane PDU session being used for performing sidelink communication between terminal devices, and the control plane PDU session being used for performing communication between the core network entity and the terminal device.

3. The method according to claim 2, wherein the establishing a user plane PDU session for the sidelink comprises:

generating a user plane PDU session parameter for the sidelink; and
configuring the user plane PDU session parameter on the terminal device, for the terminal device to establish the user plane PDU session for the sidelink according to the user plane PDU session parameter.

4. The method according to claim 1, wherein the QoS parameter for the access network entity comprises:
   a resource scheduling mode to be used by the access network entity for the terminal device, and a QoS requirement corresponding to the resource scheduling mode; or
   QoS requirement information for the sidelink, the QoS requirement information being used for the access network entity to determine a resource scheduling mode for the terminal device and a QoS requirement corresponding to the resource scheduling mode.

5. The method according to claim 1, wherein the configuration of the sidelink per-flow QoS parameter information for the terminal device by the access network entity further comprises:
   determining the sidelink per-flow QoS parameter information configured for the terminal device according to the QoS parameter for the access network entity; and
   configuring the sidelink per-flow QoS parameter information configured for the terminal device on the terminal device, to control the QoS of sidelink communication performed by the terminal device with another terminal device directly.

6. The method according to claim 5, wherein the determining the sidelink per-flow QoS parameter information configured for the terminal device according to the QoS parameter for the access network entity comprises:
   determining a resource scheduling mode for the terminal device to perform sidelink communication and a QoS requirement corresponding to the resource scheduling mode according to the sidelink per-flow QoS parameter information configured for the access network entity; and
   generating the sidelink per-flow QoS parameter information configured for the terminal device according to the resource scheduling mode and the QoS requirement corresponding to the resource scheduling mode.

7. The method according to claim 6, wherein the determining a resource scheduling mode for the terminal device to perform sidelink communication and a QoS requirement corresponding to the resource scheduling mode according to the sidelink per-flow QoS parameter information configured for the access network entity comprises:
   obtaining the resource scheduling mode and the QoS requirement corresponding to the resource scheduling mode from the sidelink per-flow QoS parameter information configured for the access network entity; or
   generating the resource scheduling mode and the QoS requirement corresponding to the resource scheduling mode according to sidelink per-flow QoS requirement information comprised in the sidelink per-flow QoS parameter information configured for the access network entity.

8. The method according to claim 5, wherein the access network entity is further configured to perform the following operations:
   controlling the terminal device to perform access stratum (AS) monitoring on a sidelink.

9. The according to claim 8, wherein the controlling the terminal device to perform AS monitoring on a sidelink comprises:

controlling a first terminal device to transmit a reference signal (RS) through a sidelink established between the first terminal device and a second terminal device;

receiving detection information fed back by the second terminal device for the RS; and determining a communication state of the sidelink between the first terminal device and the second terminal device according to the detection information.

10. The method according to claim 8, wherein the access network entity is further configured to perform the following operations:

maintaining the sidelink according to a result of monitoring the sidelink by the terminal device.

11. The method according to claim 10, wherein the maintaining the sidelink according to a result of monitoring the sidelink by the terminal device comprises:

reconfiguring a sidelink between the first terminal device and the second terminal device in a case of determining that the communication state of the sidelink between the first terminal device and the second terminal device deteriorates according to the communication state; and releasing the sidelink between the first terminal device and the second terminal device in a case of determining that the sidelink is no longer suitable for data transmission according to the communication state.

12. A core network entity, comprising:

one or more processors; and a storage apparatus, configured to store one or more programs, the one or more programs, when executed by the one or more processors, causing the one or more processors to implement the following operations:

obtaining QoS information configured by an application function (AF) entity for a sidelink in a 5G wireless network environment;

establishing a protocol data unit (PDU) session for the sidelink when determining, according to the QoS information, that the AF entity sets a per-flow QoS model for the sidelink, and generating a sidelink per-flow QoS parameter for the PDU session according to the QoS information, wherein the sidelink per-flow QoS parameter for the PDU session includes a QoS parameter for an access network entity and at least a QoS parameter for a terminal device;

configuring the QoS parameter for the access network entity on the access network entity, wherein the access network entity is further configured to configure first sidelink per-flow QoS parameter for the terminal device according to the QoS parameter for the access network entity through access stratum (AS) signaling, wherein the first sidelink per-flow QoS parameter comprises time-frequency resource information allocated to the terminal device and scheduling period information; and configuring second sidelink per-flow QoS parameter, which comprises a service priority parameter or a routing parameter, for the terminal device on the terminal device through non-access stratum (NAS) signaling, to control QoS of sidelink communication performed by the terminal device with another terminal device directly.

13. The core network entity according to claim 12, wherein the one or more programs, when executed by the one or more processors, cause the one or more processors to implement the following operation:

establishing a user plane PDU session and a control plane PDU session for the sidelink, the user plane PDU session being used for performing sidelink communication between terminal devices, and the control plane PDU session being used for performing communication between the core network entity and the terminal device.

14. The core network entity according to claim 13, wherein the one or more programs, when executed by the one or more processors, cause the one or more processors to implement the following operations:

generating a user plane PDU session parameter for the sidelink; and configuring the user plane PDU session parameter on the terminal device, for the terminal device to establish the user plane PDU session for the sidelink according to the user plane PDU session parameter.

15. The core network entity according to claim 12, wherein the QoS parameter for the access network entity comprises:

a resource scheduling mode to be used by the access network entity for the terminal device, and a QoS requirement corresponding to the resource scheduling mode; or QoS requirement information for the sidelink, the QoS requirement information being used for the access network entity to determine a resource scheduling mode for the terminal device and a QoS requirement corresponding to the resource scheduling mode.

* * * * *